Dec. 19, 1933. G. F. COUCH 1,940,623
JOURNAL BOX
Filed Aug. 30, 1929 2 Sheets-Sheet 1
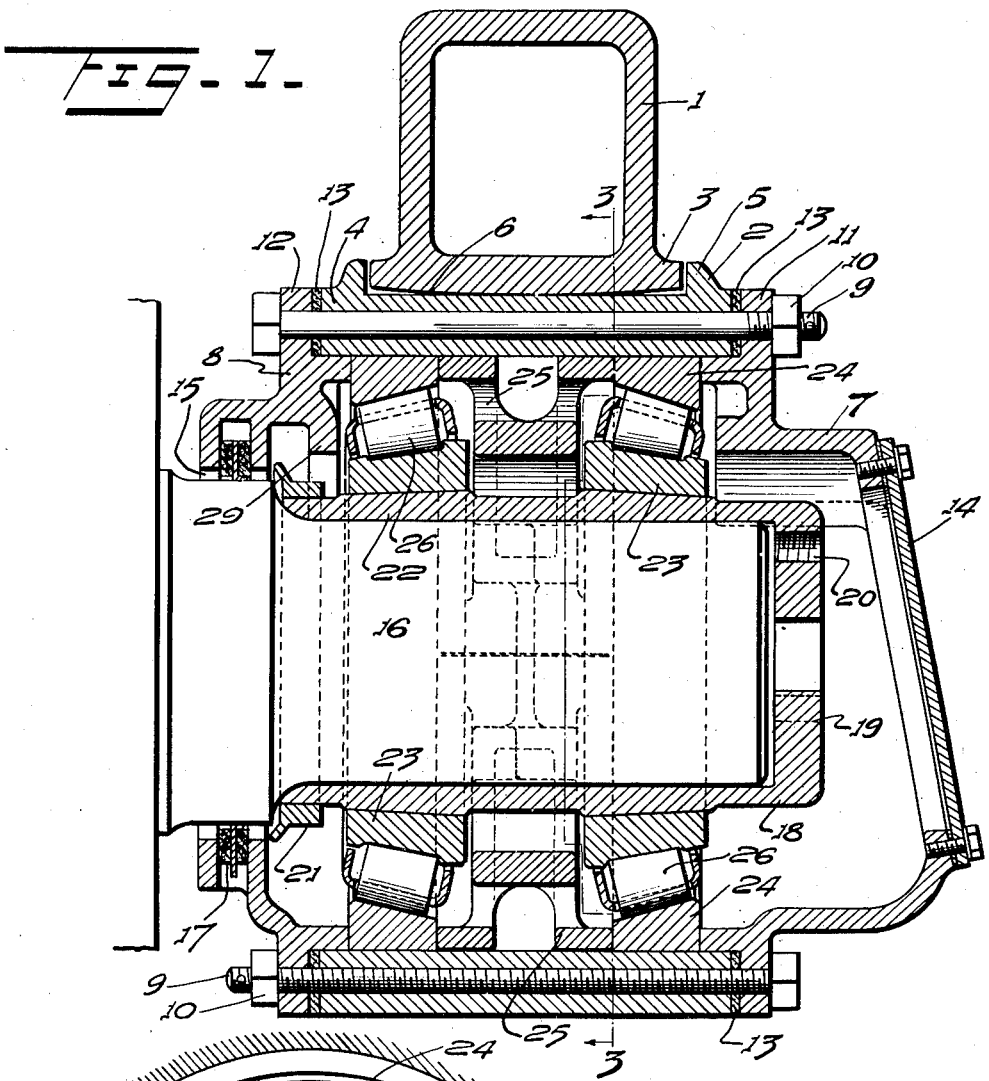
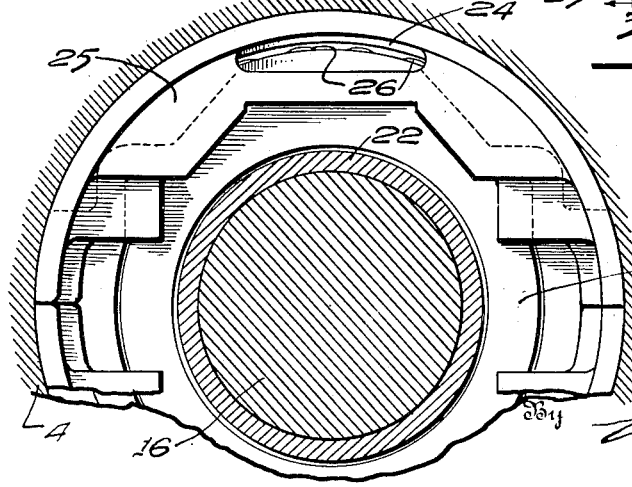
Inventor
Glenn F. Couch
Attorney

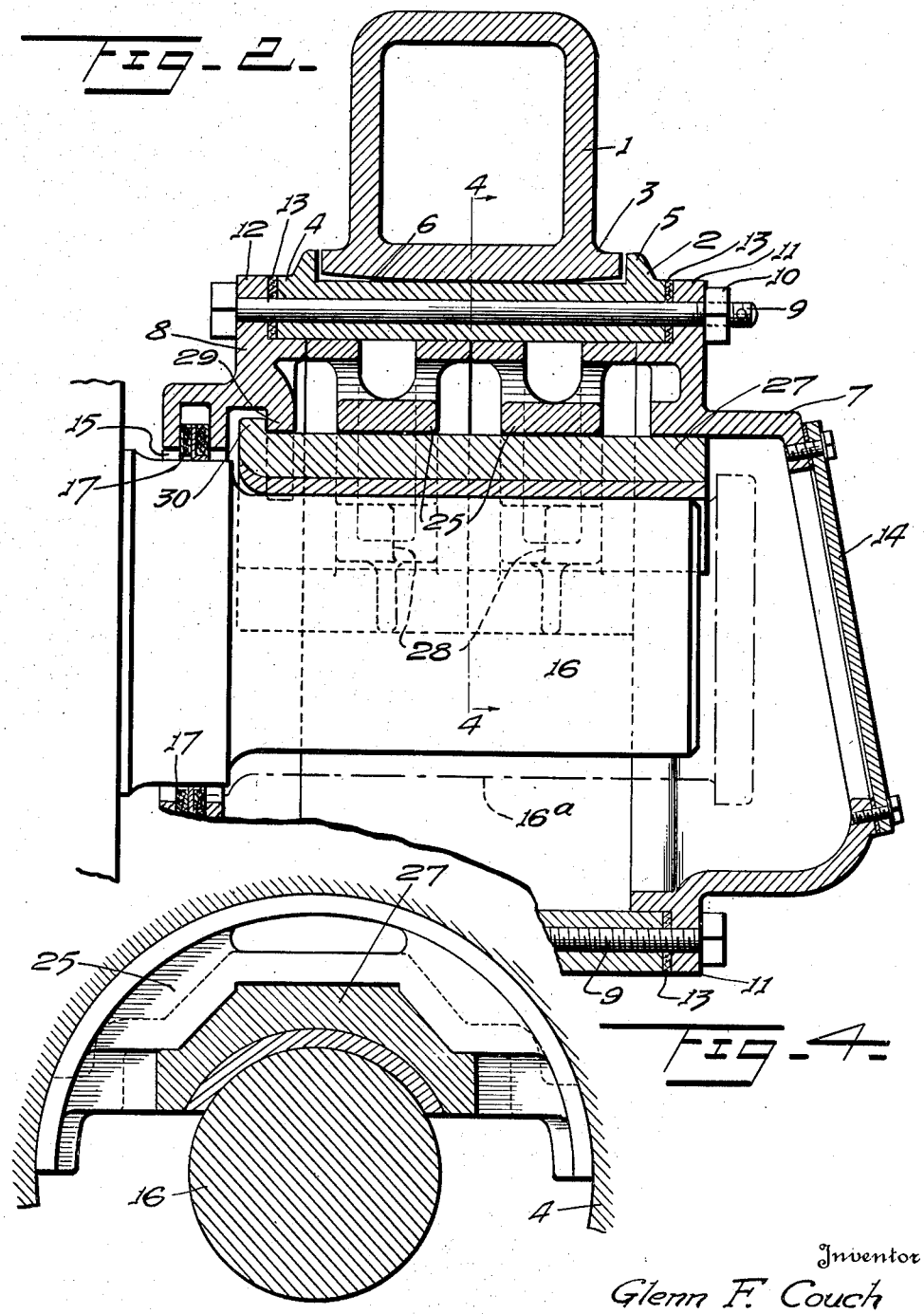

Patented Dec. 19, 1933

1,940,623

UNITED STATES PATENT OFFICE 1,940,623

JOURNAL BOX

Glenn F. Couch, Rochester, N. Y., assignor to The Symington Company, New York, N. Y., a corporation of Maryland Application August 30, 1929. Serial No. 389,513

9 Claims. (Cl. 308—180)

This invention relates to railway trucks and, more particularly, to a side frame, associated journal box, and journal received therein, the parts being normally adapted for use with roller bearings but being convertible for use with plain bearings or brasses.

The principal object of my invention, generally considered, is to provide a side frame and associated roller bearing journal box in which are preferably received two roller bearing assemblies spaced by a central split ring, said ring being of such construction that upon failure of the roller bearings, they may be removed and the two halves of the ring utilized to carry a standard brass or plain bearing.

Another object of my invention is to provide a convertible roller bearing and plain bearing journal box utilizing as common interior devices a roller bearing spacing ring whose interior surface corresponds with the outer surface of a standard brass, whereby the parts thereof may be assembled in line at the top of the box for holding a standard brass in the event of failure of the roller bearings.

A further object of my invention is to provide a convertible roller bearing and plain bearing journal box in which the journal associated therewith, when used with roller bearings, has a bushing and inner raceways mounted thereon, the box being preferably formed as a plurality of parts connected by bolts or the like, which parts, when assembled, also serve to hold the outer roller races and spacing means therebetween in place, said spacing means being of such a character that the parts thereof may be reassembled at the top of the box upon removal of the roller bearing elements and the bushing from the journal to adapt said box to receive a standard brass cooperating with said journal as in a normal journal box and journal assembly.

A still further object of my invention is to provide a side frame and associated journal box construction in which provision is made for equalizing motion of said box with respect to said frame.

Other objects and advantages of the invention relating to the particular arrangement and construction of the various parts will become apparent as the description proceeds.

Referring to the drawings illustrating my invention, the scope whereof is defined by the appended claims.

Figure 1 is a vertical transverse sectional view of a side frame and convertible roller bearing journal box assembly embodying my invention.

Figure 2 is a similar view showing the box converted for use with a plain bearing or standard brass.

Figure 3 is a fragmentary sectional view on the line 3—3 of Figure 1, looking in the direction of the arrows.

Figure 4 is a fragmentary sectional view on the line 4—4 of Figure 2, looking in the direction of the arrows.

Referring to the drawings in detail, like parts being designated by like reference characters, there is shown a side frame 1 connected in any desired manner to a journal box 2, as by having a jaw-shaped portion 3 fitting over the body 4 of said box between flanges 5 thereon. Equalization of the box 2 in the frame 1 or jaw 3 thereof is permitted by having one of the engaging surfaces, such as the surface 6 on the box, curved to permit relative rocking or angling therebetween.

The journal box 2 in the present embodiment is formed of the body portion 4, a front or outer wall or cover portion 7, a rear or inner wall or annular closure portion 8, said inner and outer portions being connected to the body portion 4 in any desired manner as by means of bolts 9 and nuts 10, said bolts passing through the body portion 4 and through circumferential flanges 11 and 12 on the outer and inner sections 7 and 8, respectively. In order to provide an oil tight construction, packing means 13 may be used between the connected parts, as illustrated. The outer portion 7 may be formed with any usual or desired lid or cover 14 to provide access to the box for replenishing the lubricant therein or for inspection purposes. The inner section 8 of the box is formed with an opening 15 for receiving an associated journal 116 and the space between said journal and the inner member 8 of the box is desirably closed by means of a dust guard 17 of any usual or desired character.

When the journal 16 is used with roller bearings, it preferably has applied thereto a bushing 18, which bushing and journal preferably are connected by a force fit. In order to provide for removal of the bushing when desired, the partially closed end 19 thereof is desirably provided with a plurality of threaded apertures 20 adapted to receive bolts 9 for the purpose of removing said bushing from the journal. The inner end of said bushing is desirably provided with an oil throwing ring 21 to minimize loss of lubricant from the box. Mounted on the bushing 18, which is desirably formed with spaced conical or tapered portions 22, are inner races or roller bearing raceways 23 which are desirably pressed in place on the tapered portions 22 of the bushing.

The outer races or raceways 24 of the roller bearings are desirably held between the body portion 4 of the journal, the end portions 7 and 8 and a central split spacing ring 25, the bolts 9 upon tightening of the nuts 10 thereof serving to force the journal end portions together and squeeze the races 24 and peripheral flange portions of said spacing ring 25 into firm engagement with one another. The rollers or rolls 26 are disposed between the inner and outer races and are desirably conical or tapered, as illustrated, with their large ends toward one another, although I do not wish to be limited to this showing. By using spaced conical rollers, not only is the journal held securely in the box, with ample provision for the transmission of radial loads, but end thrusts are properly taken care of without the necessity of auxiliary bearing means.

When it is desired to convert the box from a roller bearing journal box to one using a plain or standard brass, the parts or sectors of the split ring 25 are reassembled, as shown in Figure 2, after removal of the journal bushing, raceways and rollers, either on account of failure of the journal bearing, or for any reason whatsoever. When so assembled, end to end or parallel with the axis of the box rather than circumferentially of the box and journal and positioned in the upper part of said box as illustrated, they provide a downwardly opening seat or pocket of the proper contour for receiving a standard brass or plain bearing 27, on account of the inner surfaces of said spacing members 25 being formed to correspond with the normal outer surface of such a brass 27. This will be more clear when it is considered that the elements of the spacing ring 25 are so constructed that when assembled lengthwise of the journal, as shown in Figure 2, the lug portions 28 thereon cooperate one with another to produce what corresponds to the standard brass lug portions on a standard wedge. The inner wall or closure member 8 of the box is desirably formed with a depending lug portion 29 adapted to overlie the lug portion 30 on the end of the brass 27 to assist in retaining said brass in proper position. The spacing ring portions 25 are of such a dimension axial of the box that when in either position, they are firmly held in place by the bolts and nuts 9 and 10. In order to accomplish this result, the width or axial dimension of the ring preferably corresponds with that of the two outer races 24 or, in other words, it is double that of one of the races.

In Figure 2 I have shown the collarless journal 16 which may be of minimum diameter for a certain capacity axle, whereby it will take a standard brass of that capacity so that in an emergency the brass could be inserted in the box to take the place of the roller bearings without removal of the side frame. A standard journal 16a is shown in dot-dash lines and may be substituted when it is necessary to change wheels.

From the foregoing disclosure, it will be seen that I have devised a convertible journal box adapted for using either roller bearings or standard brasses, said box being readily changed upon removal of the roller bearing members for use with a plain bearing or standard brass without the necessity of removing the side frame. Although I have illustrated a perferred embodiment of my invention, it will be understood that modifications may be made within the spirit and scope of the appended claims and that I do not wish to be limited to the exact details shown. Although special bolts threaded for practically their full lengths may be used in the threaded apertures 20 for removing the bushing 18 from the journal 16, yet in the present embodiment the three bottom bolts 9 are desirably threaded substantially to their heads and disposed with said heads outwardly so that the bushing can be stripped off using said bolts 9 from the housing itself.

Having now described my invention, I claim:

1. In combination, a journal box, a journal received therein, a pair of roller bearings disposed between said journal and box, and a split spacing ring between said bearings, said ring being of a width equal to one half of that of the corresponding inside dimension of the box so that it is adapted for reassembly with the parts disposed side by side, independently of the roller bearings, to convert the box for carrying a plain bearing.

2. In combination, a journal box formed in parts axially separable for receiving roller bearing assemblies, a journal received therein, a pair of conical roller bearings disposed between said journal and box, a ring spacing said bearings axially of the journal, said ring being formed as two semi-circumferential pieces adapted for reassembly side by side in the top portion of the box upon removal of said roller bearings to adapt said box for carrying a standard brass.

3. In combination, a multi-part journal box, a journal received therein, a bushing fastened over the end of said journal, a pair of spaced inner races disposed on said bushing, corresponding outer races respectively engaging inner and outer parts of said box, a split ring spacing said outer races, roller bearings disposed between said inner and outer races, means to hold the parts of the box assembled with the outer races and spacing rings pressed together, said box being convertible to take a standard brass upon removal of the roller bearing parts and reassembly of the parts of the spacing ring side by side at the top of the box.

4. In combination, a journal box comprising an outer portion, an inner portion and an intermediate portion, means securely connecting said portions together, a journal received in said box, a pair of roller bearings disposed between said journal and box and formed with outer races, and a split spacing ring between said outer races, said ring and races engaging the intermediate portion of the box and clamped in position between the inner and outer portions of said box by the connecting means, said spacing ring portions being adapted for reassembly side by side in the top of the box, after removal of the roller bearings, to adapt said box for use with a plain bearing.

5. In combination, a journal box, a pair of roller bearings disposed between said journal and box and comprising outer raceways, and a split ring spacing said raceways, said ring having an axial dimension corresponding with that of the raceways so that upon removal of said roller bearings and raceways, the ring may be reassembled with the portions thereof arranged side by side in the top of the box, and axially thereof, to adapt said box for use with a standard brass.

6. In combination, a journal box formed of separable parts and adapted to receive roller bearing assemblies, a journal received therein, a pair of roller bearing assemblies disposed between said journal and box, and a multi-part separator disposed between said bearing assemblies and adapted for reassembly with the parts thereof disposed side by side in the top portion of the box, after removal of said roller bearing assemblies, to convert said box for carrying a standard brass.

7. In combination, a built-up journal box, an axle with a collarless journal received therein, a bushing fastened over the end of said journal, a pair of inner races fastened on said bushing, corresponding outer races connected to the box, spacing means disposed between said outer races and formed as a plurality of circumferentially arranged parts, said box being adapted to permit removal of the roller bearing parts and assembly of the spacing means in a line at the top of the box to convert said box to take a standard brass.

8. In combination, a journal box, a pair of roller bearings disposed between said journal and box and comprising outer raceways and a two-part spacing ring disposed between said raceways, said ring fitting over said journal and having a surface adjacent said journal corresponding with the outer surface of a standard brass, so that upon removal of the roller bearings and raceways, the spacing rings may be reassembled in line at the top of the box for receiving a standard brass.

9. A spacing device for separating the parts of a journal box roller bearing assembly, said device consisting of a pair of sectors normally forming a complete circle, provided with peripheral flange portions normally spacing outer races of such an assembly, and when reassembled side by side and axially aligned serving to space inner and outer closure members of an associated journal box, the inner surfaces of said associated sectors being shaped to accommodate a standard railway vehicle journal brass when so reassembled.

GLENN F. COUCH.